United States Patent [19]

Troiano

[11] Patent Number: 4,881,423
[45] Date of Patent: Nov. 21, 1989

[54] CABLE ACTUATING ASSEMBLY

[75] Inventor: Thomas Troiano, 1725 McManus St., Troy, Mich. 48084

[73] Assignee: Thomas Troiano, Battle Creek, Mich.

[21] Appl. No.: 191,321

[22] Filed: May 9, 1988

[51] Int. Cl.$^4$ .......................... F16C 1/10; B60R 22/00
[52] U.S. Cl. .............................. 74/501.6; 74/501.5 R; 74/500.5; 180/268; 280/803; 280/807
[58] Field of Search ................. 74/500.5, 501.5, 501.6, 74/502, 502.4, 502.6; 180/268; 280/803, 807

[56] References Cited

U.S. PATENT DOCUMENTS

| | | | |
|---|---|---|---|
| 2,853,164 | 9/1958 | Sturdy | 74/501.6 |
| 3,141,352 | 7/1964 | Richter | 74/501.5 |
| 3,730,019 | 5/1973 | Ballard | 74/502 |
| 4,007,674 | 2/1977 | Carlson | 74/502 |
| 4,798,098 | 1/1989 | Keller | 74/502.6 |
| 4,802,378 | 2/1989 | Memmola | 74/500.5 |

FOREIGN PATENT DOCUMENTS

| | | | |
|---|---|---|---|
| 813102 | 7/1949 | Fed. Rep. of Germany | 74/502.4 |
| 344531 | 5/1986 | Fed. Rep. of Germany | 280/807 |
| 366246 | 9/1906 | France | 74/502 |
| 752217 | 9/1933 | France | 74/501.6 |
| 531202 | 12/1940 | United Kingdom | 74/502.6 |

Primary Examiner—Gary L. Smith
Assistant Examiner—F. Saether
Attorney, Agent, or Firm—Varnum, Riddering, Schmidt & Howlett

[57] ABSTRACT

A cable operated assembly for actuating a device comprises a housing assembly and a plunger movably mounted within the assembly for movement between return and actuating positions. A coil spring is mounted within the housing and biases the plunger toward the return position. A cable is movable in return and actuating directions relative to the housing and has one end engageable with the device to be actuated. The other end of the cable is connected to the plunger so as to permit movement of the cable relative to the plunger when the same moves toward the actuating position, and limiting relative movement of the cable when the plunger is moved toward the return position thereby to move the cable in the return direction. A second coil spring has a biasing force less than that of the first coil spring and urges the cable in the actuating direction, but is normally compressed. Movement of the plunger toward its actuating position compresses the first spring to relieve compression on the second spring and permits the second spring to urge the cable in the actuating direction. Extension of the first spring moves the plunger toward its position and the cable in the return direction thereby compressing the second spring.

13 Claims, 3 Drawing Sheets

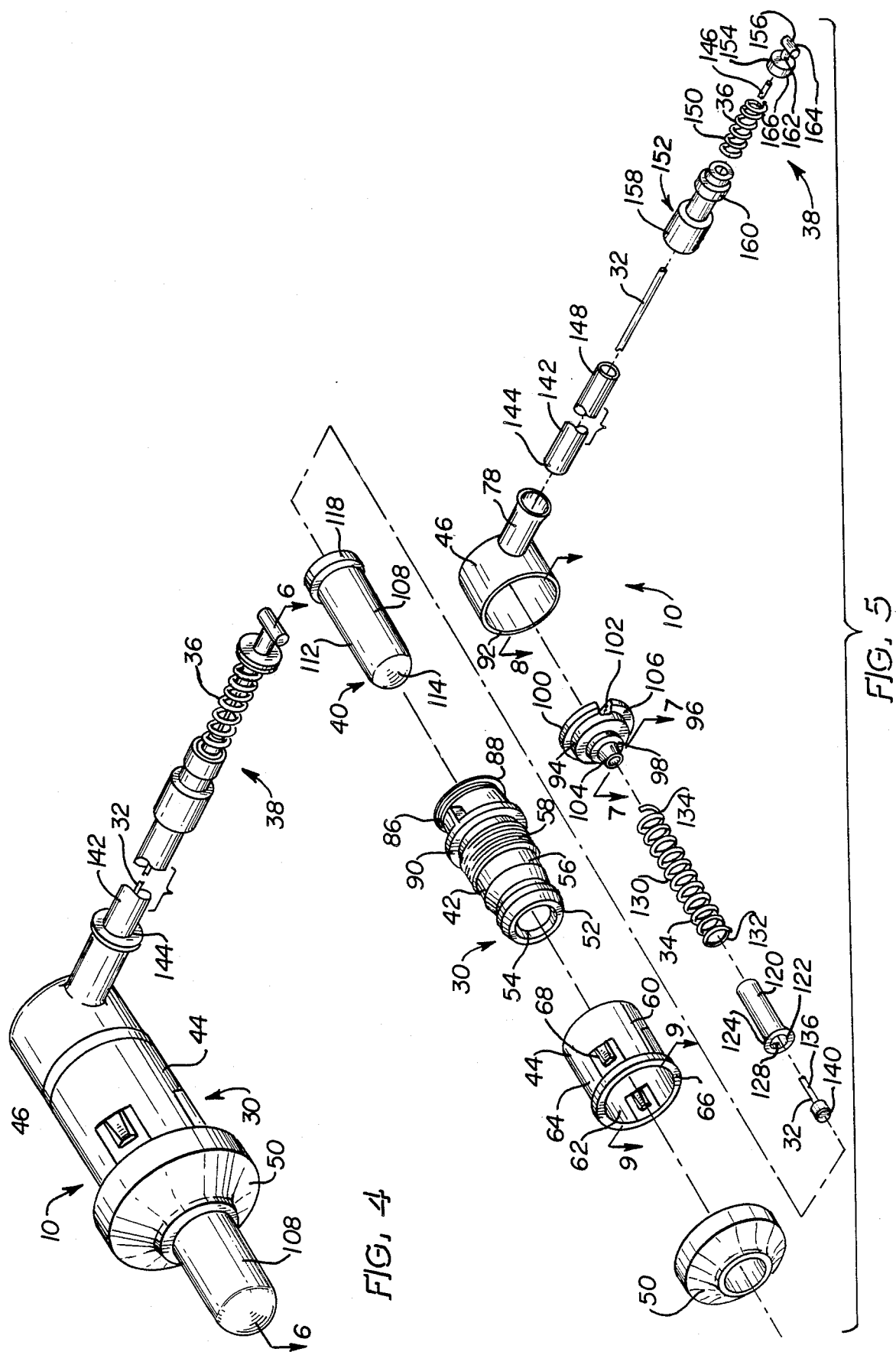

CABLE ACTUATING ASSEMBLY

FIELD OF THE INVENTION

The invention relates to cable-operated actuating assemblies and more specifically to a cable-operated assembly for actuating a vehicle seat belt spring-biased release latch to permit extension of a seat belt once the same has been locked in an extended position.

BACKGROUND OF THE INVENTION

Cable operated actuating devices are known. For example, in the automotive industry, a cable-operated device known as a seat belt comfort release assembly is known and is adapted to permit extension of the seat belt subsequent to the same being set in locked condition.

Generally, a vehicle seat belt is movable between retracted and extended positions from a holder and is normally retained in the retracted position by a biasing means. In the extended position, the belt is engagable with a lock by virtue of a tang on the belt. Once placed in the extended position, the belt is prevented from further extension by a spring latch mechanism in the holder that restrains a "strapped-in" occupant from forward movement during an abrupt stop of the vehicle. Although the spring latch mechanism provides safety to the occupant, it is also a source of discomfort. Because the belt is biased in the retracted position, once locked in place, the belt is drawn tightly against the occupant's chest and is prevented from further extension by the spring latch mechanism.

To alleviate the above-described discomfort, automakers employ seat belt comfort release assemblies. Such assemblies permit the belt to be further extended a short distance subsequent to the belt being placed in an extended condition. The assembly is mounted within a vehicle door or door sill and typically comprises: a housing fitted with the door or door sill; a plunger mounted within the housing for movement between inner and outer positions; a biasing means in the housing for biasing the plunger in the outer position; and a cable mounted at a first end thereof in the housing and to the plunger and operably connected at the cable second end to the seat belt spring latch mechanism. The cable first end is adapted to move relative to the housing when the plunger moves between the inner and outer positions. The cable first end extends directly out of the housing rear end and is necessarily routed at 90° from the housing due to the position of the housing relative to the seat belt holder. In operation, when the vehicle door is closed, the same depresses the plunger to the inner position thereby moving the cable and actuating the seat belt spring latch mechanism to permit the belt to be further extended the above-stated short distance. When the door is opened, the plunger is biased in its outer position and the spring latch mechanism operates normally to prevent extension of the belt.

There are a number of disadvantages associated with prior-art seat belt comfort release cable assemblies. One major problem is kinking of the cable in the housing. When the vehicle door is "slammed," the cable first end can kink in the housing as a result of being forced through the housing opening. Once the cable is kinked, smooth operation thereof is severely impaired. The kinking is the result of pushing the cable through the housing opening. To compound this problem, the cable first end, as stated above, must be routed 90° from the housing, thereby making the cable more susceptible to kinking.

In addition, the tendency of the cable to kink causes cable buckle resistance, a force opposing the force of the vehicle door when the same is swung to its closed position. Cable buckle resistance is partially responsible for the annoying occurrence of the vehicle door not fully closing upon being swung toward its closed position.

Another disadvantage of prior-art assemblies is the relatively large amount of space required for packaging, storage and shipping of the same. Because the cable first end extends straight back from the housing, relatively large packaging is required and consequently storage and shipping costs are high.

In view of the foregoing disadvantages, it has been found desirable to provide a seat belt comfort release wherein the cable first end is pulled from the housing rather than pushed therefrom as described above. By this design, the foregoing problems associated with prior art assemblies are eliminated as will be discussed below in detail.

SUMMARY OF THE INVENTION

According to the invention, a cable operated assembly actuates a device and comprises a housing, an actuating means mounted to the housing for movement relative thereto between return and actuating positions and a first biasing means mounted to the housing and urging the actuating means toward the return position. A cable is reciprocally movable in return and actuating directions relative to the housing and has a first end connected to the actuating means and a second end engageable with the device to be actuated.

In addition, the assembly comprises a connecting means for slidably connecting the cable first end to the actuating means. The connecting means permits movement of the cable first end relative to the actuating means when the actuating means is moved toward the actuating position. The connecting means limits relative movement of the cable first end when the actuating means is moved toward the return position to thereby move the cable in the return direction.

In addition, the assembly comprises a second biasing means having a biasing force less than that of the first biasing means and urging the cable in the actuating direction. The second biasing means is normally compressed.

Movement of the actuating means toward the actuating position in response to external forces exerted thereon acts to compress the first biasing means to relieve compression on the second biasing means thereby permitting the second biasing means to force the cable in the actuating direction. Extension of the first biasing means when external forces on the actuating means are relieved moves the actuating means towards the return position and the cable in the return direction thereby compressing the second biasing means.

Further, the assembly comprises a sheath enclosing the cable between the cable first and second ends. The cable is movable relative to the sheath in the return and actuating directions. A mounting means secures the second biasing means to and between the sheath and the cable second end.

In a preferred embodiment of the invention, the assembly also includes a means for routing the cable first end from the housing at 90 degrees with respect to directional movement of the actuating means. The routing means alters direction of the cable first end with respect to the housing along a 90 degree curve.

In addition, the housing further comprises a top wall and an open top. The actuating means comprises a first hollow body slidably received in the housing through the housing open top for movement relative to the housing between the return and actuating positions of the actuating means. The first hollow body has side walls, a top wall opposing the housing bottom wall and an open bottom in registry with the housing open top. The first biasing means is interposed between the housing bottom wall and the first hollow body top wall and urges the first hollow body toward the return position of the actuating means. The connecting means is mounted within the first hollow body and comprises a transverse wall interposed between the hollow body side walls. The transverse wall has an aperture extending therethrough. The cable first end is positioned within the hollow body and extends through the aperture. The connecting means further comprises a stop securely mounted on the cable first end and adapted to be engaged by the transverse wall when the actuating means is moved toward the return position to thereby move the cable in the return direction.

BRIEF DESCRIPTION OF THE DRAWINGS

Reference will now be made to the drawings in which:

FIG. 4 is a perspective view of the actuating assembly of FIG. 1;

FIG. 5 is an exploded view of the actuating assembly shown in FIG. 4;

DESCRIPTION OF THE PREFERRED EMBODIMENTS

Referring generally to the drawings, there is shown a cable operated actuating assembly 10. Although the assembly 10 can be used to actuate a variety of devices wherein a cable actuating assembly is used, the invention is primarily intended for use in connection with a vehicle seat belt as set forth above.

Figure 2:
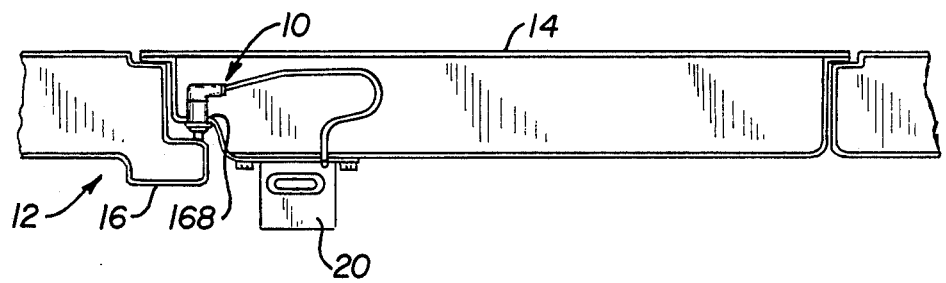
FIG. 2 is a partial plan view of the automobile door of FIG. 1.
Figure 1:
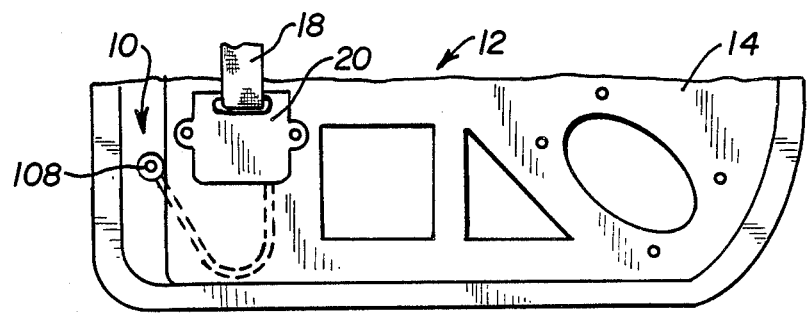
FIG. 1 is a partial side elevational view of an automobile door showing a seat belt assembly and an actuating assembly built in accordance with the invention.
Figure 3:
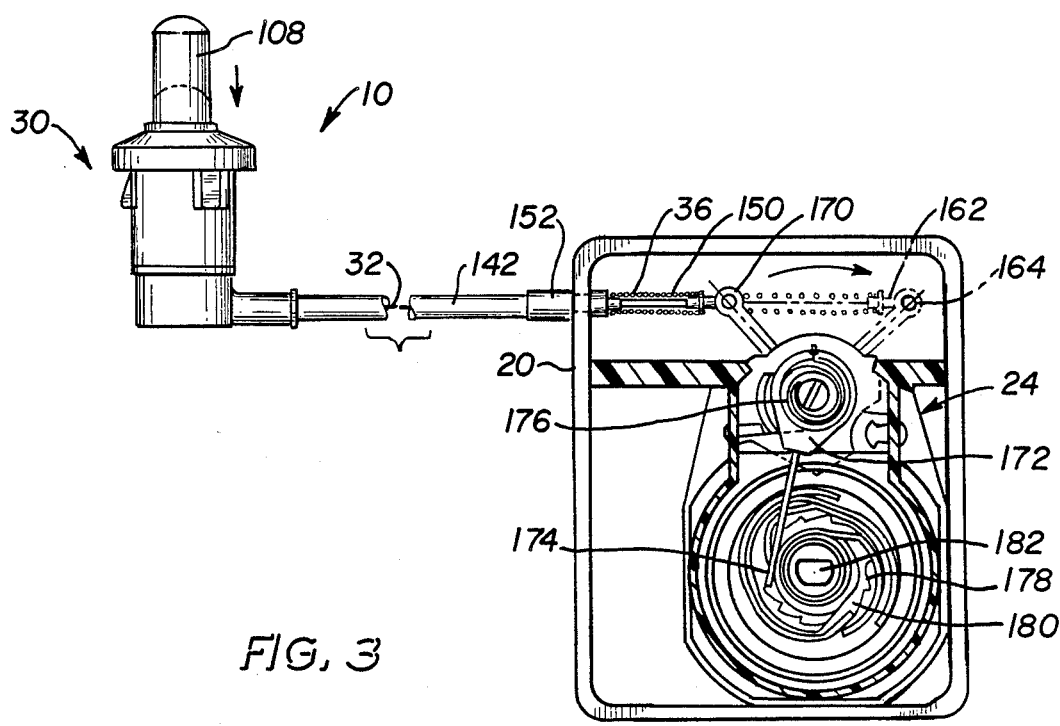
FIG. 3 is a side elevational view showing the connection of the actuating assembly with a spring latch mechanism of the belt assembly of FIG. 1 with the vehicle door removed.

As illustrated in FIGS. 1–3, a vehicle 12 generally comprises, in relevant part, a door 14, a door sill 16, a seat belt 18 movable between retracted and extended positions from a holder 20 and normally retained in the retracted position by a biasing means (not shown) with the holder. In the extended position, the belt 18 is engagable with a lock (not shown) by virtue of a tang (not shown) on the belt. Once set and locked in the extended position, the belt 18 is prevented from further extension by a spring latch mechanism 24 in the holder 20. The mechanism 24 restrains a "strapped-in" occupant from forward movement during an abrupt stop of the vehicle 12.

Reference can be made to U.S. Pat. No. 4,603,819 to Loose et al., issued Aug. 5, 1986; U.S. Pat. No. 4,002,311 to Fisher, issued Jan. 11, 1977; and U.S. Pat. No. 3,973,786 to Rogers, Jr., issued Aug. 10, 1976, for a complete explanation of the structure and function of the spring latch mechanism and the entire seat belt assembly. Generally, a winding spring (not shown) normally biases a reel (not shown) in a winding direction, the seat belt 18 is removably wound on the reel. An inertial locking device (not shown) locks the reel against unwinding. Reference can be made to U.S. Pat. No. 3,948,460 to Kondziola, issued Apr. 6, 1976, for a complete explanation of the structure and function of the inertial locking device. Because the belt 18 is biased in the retracted position, once locked in place, the belt is drawn tightly against the occupant's chest and is prevented from further extension by the spring latch mechanism. The actuating assembly 10 of the invention is adapted to alleviate the resulting discomfort to the occupant by releasing the spring latch mechanism 24 so as to permit the belt 18 to be further extended from the holder 20 a short distance to provide a sufficient amount of slack in the belt so as to not unduly press against the occupant's chest. While the actuating assembly 10 enables the belt to be extended from the seat belt holder 20, it is the spring latch mechanism 24 that determines the amount of belt extension allowed. The actuating assembly cannot regulate the amount of belt extension.

Figure 6:
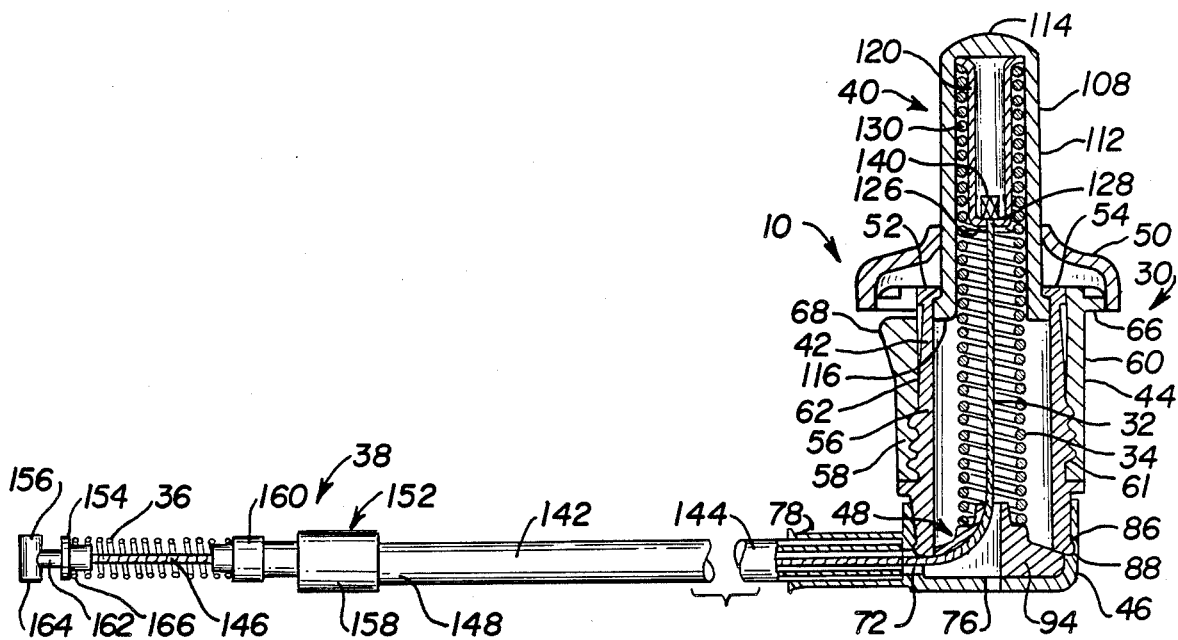
FIG. 6 side elevational view of the actuating assembly showing a sectional view of a housing assembly taken along 6—6 of FIG. 4.

As illustrated in FIGS. 4–6, the assembly 10 comprises a housing assembly 30, a cable 32 positioned, in part, in the housing assembly and movable in and out of the same a predetermined extent in actuating and return directions, a first biasing means 34 within the housing assembly for normally urging the cable in the return direction, a second biasing means 36 for urging the cable in the actuating direction, a mounting means 38 for mounting the second biasing means to the cable, and an actuating means 40 for actuating movement of the cable in the actuating and return directions.

The housing assembly 30 comprises a housing 42, a retainer 44, a housing cap 46 a routing means 48, and an optional cover 50. The housing 42 is a hollow substantially cylindrical member having on an outer open axial end 52 thereof an inwardly extending annular flange 54. In addition, the housing has on an outer wall 56 thereof a plurality of threads 58.

Figures 8, 9:
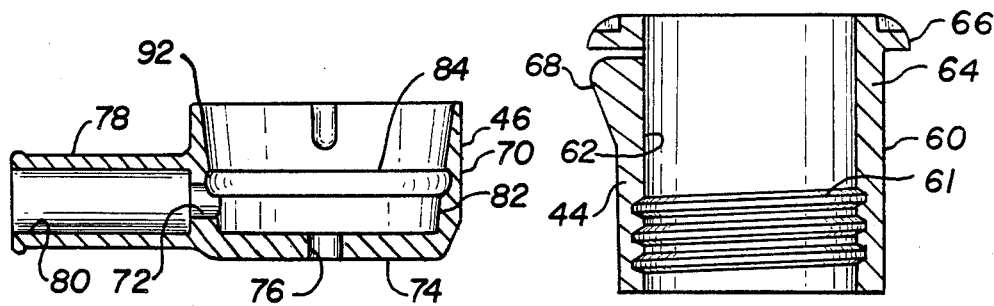
FIG. 8 is a sectional view of a housing cap taken along line 8—8 of FIG. 5.
FIG. 9 is a sectional view of a retainer taken along line 9—9 of FIG. 5.

As best seen in FIGS. 5 and 9, the retainer 44 is also generally cylindrical in shape and is removably mounted to the housing 42. To this end, the retainer comprises a body portion 60 having threads 61 on an inside wall 62 thereof engaging the threads 58 of the housing 42. In addition, the retainer 44 comprises on an upper end 64 thereof an outwardly extending annular flange 66 for mounting the housing assembly 30 and specifically the retainer to the automobile door 14 or door sill 16 as will be discussed below in detail. A plurality of resilient tabs 68 integrally formed on the upper end 64 of the body portion 60 beneath and in spaced relationship to the flange 66 function to secure the retainer to the automobile door 14 or door sill 16 as is discussed below.

Referring to FIGS. 5, 6 and 8, the housing cap 46 is also generally cylindrical in shape and comprises a cylindrical side wall 70 having a first aperture 72 therethrough and an inner wall 74 having a central second aperture 76 therethrough. In addition, the cap includes a hollow cylindrical member 78 mounted to the side wall 70 and having a central duct 80 aligned with the first aperture 72.

The housing cap 46 is securely mounted to the housing at an inner end 82 thereof. To this end, the cap sidewall 70 includes an inner groove 84 receiving an inner flange 86 on a bottom edge 88 of the housing. In this manner, the cap is mounted to the housing in snapfit relationship thereto. In addition, an outwardly extending intermediate housing flange 90 engages a top edge 92 of the cap side wall 70 when the housing is fully mounted to the cap, thereby further securing the housing and the cap together.

As seen in FIGS. 4-6, the optional cover 50 of the housing assembly 30 can be mounted on the housing outer axial end 52 to prevent contaminants from entering the housing assembly.

Figure 7:
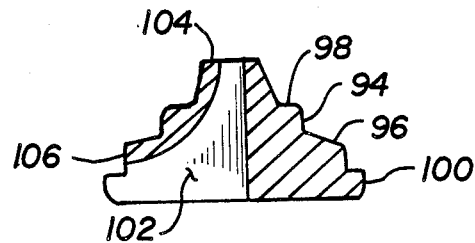
FIG. 7 is a sectional view of a pedestal taken along line 7—7 FIG. 5.

Referring to FIGS. 6-8, the routing means 48 forms a passage for the cable 32 to extend out of the housing 42 and comprises the aligned aperture 72 and duct 80 and a pedestal 94 positioned within the cap 46 and housing 42. The pedestal 94 is generally conical in shape having first and second step portions 96, 98. The pedestal base 100 engages the inner wall 74 of the cap 46. The pedestal first step portion 96 engages the bottom edge 88 of the housing 42. By this design, the pedestal 94 is thus securely sandwiched between the cap inner wall 74 and the housing 42. The pedestal 94 further comprises a passage 102 forming a 90° curve and extending from the pedestal apex 104 to a side portion 106 of the pedestal aligning with the housing cap duct 80. In this manner, the routing means 48 functions to route the cable 32 to the outside of the housing assembly 30 while altering the cable direction by 90°.

As shown in FIGS. 5 and 6, the actuating means 40 comprises a hollow substantially cylindrical plunger 108 slidably mounted within the housing 42 through the outer axial open end 52 of the same for movement between return and actuating positions. The plunger 108 has a side wall 112, an outer wall 114 and an open inner end 116 in registry with the housing open end 52. An outwardly directed annular flange 118 at the plunger open inner end 116 is adapted to engage the housing flange 54 to limit outward movement of the plunger with respect to the housing 42 and thereby prevent disengagement of the former from the latter.

A cylindrically shaped carrier 120 is mounted within the plunger 108. The carrier 120 has an open outer end 122 with an outwardly directed flange 124, and an inner transverse wall 126 having an aperture 128 therethrough. The carrier 120 is positioned within the plunger 108 such that the open outer end 122 of the carrier engages the plunger outer wall 114. The carrier 120 functions to retain the cable 32 within the housing assembly 30 as will be described below.

Again referring to FIGS. 5 and 6, mounted to and within the plunger 108 and the housing assembly 30 is the first biasing means 34 comprising a first coil spring 130 having an outer end 132 thereof in engagement with the carrier flange 124, and having an inner end 134 of the spring resting on the second step portion 98 of the pedestal 94. In this manner, the first biasing means 34 urges the plunger 108 in the outer position relative to the housing assembly. The first coil spring 130 also functions to bias the cable 32 in its return position as discussed below.

The housing assembly 30, the plunger 108, and the carrier 120 are preferably made of plastic for ease of manufacture and for obtaining the required sliding and flexibility characteristics. Grease is applied within the housing assembly 30 to maintain lubrication of the moving parts. The second cap aperture 76 functions as an airhole when the plunger is moved inwardly or outwardly of the housing assembly.

As illustrated in FIGS. 5 and 6, the cable 32 is preferably formed of a plurality of braided metal strands and is mounted at a first end 136 thereof to the carrier 120. Specifically, the cable first end 136 is set in registry with the carrier interior 138 through the aperture 128 of the transverse wall 126. A stop 140 positioned within the carrier 120 is secured to the cable first end. The stop 140 is adapted to engage the carrier transverse wall 126 to retain the cable first end 136 within the plunger 108 when the same is moved from the actuating position to the return position. The stop is preferably made of metal and is secured to the cable by a suitable crimping means.

A flexible plastic sheath 142 having a first end 144 securely mounted to the hollow member within the cap duct 80 serves to protect the cable 32. The cable is slidably mounted within the sheath 142 and has a second end 146 extending from the sheath second end 148.

As illustrated in FIGS. 3-6, mounted to and between the cable second end 146 and the sheath second end 148 is the second biasing means 36 comprising a second coil spring 150. The mounting means 38 secures the second biasing means 36 between the sheath second end 148 and the cable second end 146. The mounting means comprises first and second caps 152, 154 and a T-end 156. The first cap 152 is mounted to the sheath second end 148 and comprises a hollow cylindrical collar 158 mounted on the sheath second end 148, and a first annular shelf 160. The first cap 152 is preferably made of plastic molded onto the sheath second end 148.

The T-end 156 comprises first and second cylindrical portions 162, 164 oriented perpendicularly to each other, thereby forming the T. The first cylindrical portion 162 is securely mounted on the cable second end 146. The second cylindrical portion is adapted to effect actuation of the spring latch mechanism 24 as discussed below. The T-end is preferably made of zinc cast onto the cable 32. The mounting means second cap 154 is securely mounted to or formed integrally with the first cylindrical portion 162 and includes a second annular shelf 166. The second coil spring 150 is interposed between and bears against the first and second annular shelves 160, 166 to urge the cable second end in the actuating direction.

As illustrated in FIGS. 1-3, the actuating assembly 10 may be mounted in an opening 168 in the automobile door 14 by positioning the housing assembly 30 through the opening and sandwiching the door between the tabs 68 and the flange 54. The actuating assembly can also be mounted to the door sill 16. The cable second end 146 is attached to a cam lever 170 the seat belt spring latch mechanism 24. As stated above, the cable 32 must be routed at 90° with respect to directional movement of the plunger 108. By directing the cable through the gradually curved routing means 48, the longitudinal axis of the cable is oriented at such 90° angle, thereby enabling a smooth transition of orientation and consequently reducing the tendency of the cable 32 to kink during operation of the actuating assembly 10.

The second spring 150 has a spring constant or biasing force less than that of the first spring 130. Therefore, when the vehicle door 14 is opened, the first spring normally biases the plunger 108 in its return position and thereby compressing the second spring 150. When the vehicle door 14 is closed, it forces the plunger inwardly of the housing to the plunger's actuating position, thereby compressing the first spring 130. As a result, the second spring 150 is permitted to expand and pull the cable 32 in the actuating direction to actuate the spring latch mechanism 24.

Reference can be made to the Loose et al. and Fisher patents identified above for a complete explanation of the structure and function of how prior art cable assemblies interface with the spring latch mechanism 24. The cable second end 146 of the invention is adapted to interface with the spring latch mechanism in a manner similar to that disclosed by the prior art references. In general, as shown in FIG. 3, the cable second end 146 is mounted to the cam lever 170 of a pivoting release cam 172. Pivotal movement of the release cam 172 caused by movement of the actuating assembly cable 32 in the return direction causes a follower pawl 174 to tilt inwardly against the biasing force of a spring latch mechanism spring 176 and to be set out of engagement with teeth 178 of a ratchet wheel 180. Such disengagement allows the seat belt reel (not shown) connected to a reel shaft 182 to rewind the seat belt 18 on the reel. When the cable 32 is moved in the actuating direction, the pawl 174 is set in engagement with a ratchet tooth 178, permitting slight extension of the seat belt and preventing rewinding of the same. Therefore, when the vehicle door is opened and the cable is in the return position, the seat belt will be rewound on the spool. When the door is closed and the cable 32 is in the actuating position, the pawl 174 engages a ratchet tooth 178, thereby allowing further extension of the seat belt and preventing rewinding of the same so as to not unduly restrain the user.

The invention has numerous advantages. First, because the cable is pulled rather than pushed through the housing opening, the cable has less tendency to kink in the housing. Also, the preferred design makes feasible positioning of the cable through a sidewall of the housing assembly and at 90° to directional movement of the plunger, with the right angle having a relatively small radius of curvature. As a result, packaging, shipping and storage costs can be reduced over that associated with assemblies wherein the cables extend straight back from rear walls of the housings. Further, an occupant need not worry about cable buckle resistance, thereby reducing the likelihood of partial door closure. Further, door closing is made easier. In prior-art assemblies, the spring in the housing resists closing of the vehicle door. In the invention, the spring at the cable second end "assists" with door closing by reducing the total resistance of the spring in the housing to closing of the door.

While the invention has been described in connection with a preferred embodiment, it is understood that I do not intend to limit the invention to that embodiment. To the contrary, I intend to cover all alternative modifications and equivalents as may be included within the spirit and scope of the invention as defined by the appended claims.

I claim:

1. A cable operated assembly for actuating a device, said assembly comprising:
   a housing;
   actuating means mounted to said housing for movement relative thereto between return and actuating positions;
   first biasing means urging said actuating means toward said return position;
   a cable reciprocally movable in return and actuating directions relative to said housing and having first and second ends, said first end being positioned within said housing, said second end being engageable with a device to be actuated;
   means for connecting said first end of said cable to said actuating means, said connecting means permitting movement of said cable first end relative to said actuating means when said actuating means is moved toward said actuating position, said connecting means limiting movement of said cable first end relative to said actuating means when said actuating means is moved toward said return position thereby to move said cable in said return direction;
   second biasing means having a biasing force less than that of said first biasing means and urging said cable in said actuating direction, said second biasing means being normally compressed; and
   means for routing said cable first end from said housing at 90° with respect to directional movement of said actuating means, said routing means being disposed in said housing;
   whereby movement of said actuating means toward said actuating position in response to external forces exerted thereon acts to compress said first biasing means and free said cable from said actuating means to permit said cable to be drawn in said actuating direction through said routing means exclusively by said second biasing means thereby to deter interference with movement of said cable in said actuating direction by said housing.

2. A cable operated assembly according to claim 1, wherein said routing means alters direction of said cable first end with respect to said housing along a curve of 90°.

3. An assembly according to claim 2, wherein said housing further comprises a side wall having an opening extending therethrough;
   said routing means comprises channel means positioned within said housing and having a passage extending through said channel means, said passage extending along a 90° curve and intersecting a first surface of said channel means facing said actuating means and a second surface of said channel means normal to said first surface, said passage further being in registry with said opening in said side wall; and
   said cable is slidably received in said passage and extends through said opening in said side wall.

4. An assembly according to claim 1, and further comprising a sheath enclosing said cable between said cable first and second ends, said cable being movable relative to said sheath in said return and actuating directions; and
   means for mounting said second biasing means to and between said sheath and said cable second end;
   whereby compression of said first biasing means permits extension of said second biasing means to urge said cable in said actuating direction.

5. An assembly according to claim 4, wherein said second biasing means comprises a coil spring circumscribing said cable second end; and said mounting means comprises first and second caps, said first cap being securely mounted to an end of said sheath adjacent said cable second end and having a first annular flange, said second cap being securely mounted to said cable second end and having a second annular flange opposing said first annular flange, said coil spring being positioned between and bearing against said first and second annular flanges.

6. An assembly according to claim 5, wherein said mounting means further comprises a T-shaped end having one end member rigidly secured to and coextensive with a longitudinal axis of said cable second end and another end member secured and positioned normal to said one end member, said second cap being secured to said one end member, whereby said other end member is adapted to move in said actuating direction of said cable when said first biasing means is compressed and said coil spring extends.

7. An assembly according to claim 1, wherein said housing further comprises a sidewall having an opening extending therethrough;
said routing means comprises a channel means positioned within said housing and having a passage extending through said channel means, said passage extending along a 90-degree curve and intersecting a first surface of said channel means facing said actuating means and a second surface of said channel means normal to said first surface, said passage further being in registry with said opening in said housing sidewall; and
said cable is slidably received in said passage and extends through said opening in said housing sidewall.

8. An assembly according to claim 1, wherein said housing further comprises a bottom wall and an open top;
said actuating means comprises a first hollow body slidably received in said housing through said housing open top for movement relative to said housing between said return and actuating positions of said actuating means, said first hollow body having sidewalls, a top wall opposing said housing bottom wall and an open bottom in registry with said housing open top;
said first biasing means is interposed between said housing bottom wall and said first hollow body top wall and urges said first hollow body toward said return position of said actuating means; and
said connecting means is mounted within said first hollow body and comprises a transverse wall interposed between said first hollow body sidewalls, said transverse wall having an aperture extending therethrough, said cable first end being positioned within said first hollow body and extending through said aperture, said connecting means further comprising a stop securely mounted on said cable first end and adapted to be engaged by said transverse wall when said actuating means is moved toward said return position thereby to move said cable in said return direction.

9. An assembly according to claim 8, wherein said connecting means further comprises a second hollow body having sides, an open upper end and an annular rim extending outwardly from said sides at said open upper end, said transverse wall extending between said second hollow body sides, said second hollow body being securely mounted within said first hollow body with said second hollow body sides positioned in spaced relationship with respect to said first hollow body sidewalls and said annular rim engaging said first hollow body sidewalls in press-fit relationship relative thereto adjacent said first hollow body top wall; and
said first biasing means comprises a coil spring positioned between and bearing against said second body annular rim and said housing bottom wall, circumscribing said second hollow body and said cable first end, and positioned between said first hollow body sidewalls and said second hollow body sides.

10. An assembly according to claim 1, wherein said cable first end is positioned within said housing and said assembly further comprises:
a sheath enclosing said cable between said cable first and second ends, said cable being movable relative to said sheath in said return and actuating directions;
means for mounting said second biasing means to and between said sheath and said cable second end; and
means for routing said cable first end from said housing at 90 degrees relative to directional movement of said actuating means.

11. An assembly according to claim 10, wherein said housing further comprises a sidewall having an opening extending therethrough, said opening being in registry with an end of said sheath adjacent said cable first end;
said second biasing means comprises a coil spring circumscribing said cable second end;
said mounting means comprises first and second caps, said first cap being securely mounted to an end of said sheath adjacent said cable second end and having a first annular flange, said second cap being securely mounted to said cable second end and having a second annular flange opposing said first annular flange, said coil spring being positioned between and bearing against said first and second annular flanges to urge said cable in said actuating direction; and
said routing means comprises a channel means positioned within said housing and having a passage extending through said channel means, said passage extending along a 90-degree curve and intersecting a first surface of said channel means facing said actuating means and a second surface of said channel means normal to said first surface, and said passage further being in registry with said opening in said housing sidewall.

12. An assembly according to claim 11, wherein said housing further comprises an open top; and
said actuating means comprises a first hollow body slidably received in said housing through said housing open top for movement relative to said housing between said actuating and return positions of said actuating means, said first hollow body having sidewalls, a top wall opposing said channel means and an open bottom in registry with said housing open top;
said first biasing means is interposed between said channel means and said hollow body top wall to urge said first hollow body toward said return position of said actuating means; and
said connecting means is mounted within said first hollow body and comprises a transverse wall interposed between said first hollow body sidewalls, said transverse wall having an aperture extending therethrough, said cable first end being positioned within said first hollow body and extending through said aperture, said connecting means further comprising a stop securely mounted on said cable first end and adapted to be engaged by said transverse wall when said actuating means is moved toward said return position thereby to move said cable in said return direction.

13. An assembly according to claim 12, wherein said channel means comprises an annular shelf positioned above said channel means second surface;

said connecting means further comprises a second hollow body having sides, an open upper end and an annular rim extending outwardly from said sides at said open upper end, said transverse wall extending between said second hollow body sides, said second hollow body being securely mounted within said first hollow body with said second hollow body sides positioned in spaced relationship with respect to said first hollow body sidewalls and said annular rim engaging said first hollow body sidewalls in press-fit relationship thereto adjacent said first hollow body top wall; and said first biasing means comprises another coil spring positioned between and bearing against said second hollow body annular rim and said channel means annular shelf, circumscribing said second hollow body and said cable first end, and positioned between said first body sidewalls and said second body sides.

* * * * *

UNITED STATES PATENT AND TRADEMARK OFFICE
CERTIFICATE OF CORRECTION

PATENT NO. : 4,881,423

DATED : November 21, 1989

INVENTOR(S) : THOMAS TROIANO

It is certified that error appears in the above-identified patent and that said Letters Patent is hereby corrected as shown below:

Title page:

Assignee: HI-LEX Corporation, Battle Creek, Michigan.

Signed and Sealed this

Twelfth Day of May, 1992

Attest:

DOUGLAS B. COMER

*Attesting Officer*  *Acting Commissioner of Patents and Trademarks*